United States Patent [19]

Goodman

[11] 4,180,736
[45] Dec. 25, 1979

[54] USE OF A LARGE TIME-COMPENSATED SCINTILLATION DETECTOR IN NEUTRON TIME-OF-FLIGHT MEASUREMENTS

[75] Inventor: Charles D. Goodman, Oak Ridge, Tenn.

[73] Assignee: The United States of America as represented by the United States Department of Energy, Washington, D.C.

[21] Appl. No.: 945,375

[22] Filed: Sep. 25, 1978

[51] Int. Cl.$^2$ .............................. G01T 1/20; G01T 3/00
[52] U.S. Cl. ................................ 250/363 R; 250/369; 250/390; 250/392
[58] Field of Search ............... 250/361 R, 363 R, 369, 250/390, 391, 392

[56] References Cited

U.S. PATENT DOCUMENTS

| 3,517,193 | 6/1970 | Mook, Jr. et al. | 250/392 |
| 3,519,822 | 7/1970 | Sleege | 250/392 |

Primary Examiner—Davis L. Willis
Attorney, Agent, or Firm—R. V. Lupo; Stephen D. Hamel

[57] ABSTRACT

A scintillator for neutron time-of-flight measurements is positioned at a desired angle with respect to the neutron beam, and as a function of the energy thereof, such that the sum of the transit times of the neutrons and photons in the scintillator are substantially independent of the points of scintillations within the scintillator. Extrapolated zero timing is employed rather than the usual constant fraction timing. As a result, a substantially larger scintillator can be employed that substantially increases the data rate and shortens the experiment time.

3 Claims, 6 Drawing Figures $$t_n = \frac{(x\cos\phi + y\sin\phi)}{\beta c} \qquad t_p = \frac{n(L-x)}{c\cos\theta}$$

USE OF A LARGE TIME-COMPENSATED SCINTILLATION DETECTOR IN NEUTRON TIME-OF-FLIGHT MEASUREMENTS

BACKGROUND OF THE INVENTION

This invention was made in the course of, or under, a contract with the U.S. Department of Energy.

A neutron possesses no electrical charge and therefore its energy cannot be measured by electromagnetic deflection or ionization techniques that are the mainstays of charged particle energy measurements. Neutrons can, however, be detected as they pass through materials because they scatter from and react with atomic nuclei and the recoiling nuclei are charged and produce ionization. Unfortunately, the recoil energy is not a satisfactory measure of the neutron energy because it depends on the scattering angle, which is a random variable.

Neutron energies are usually measured by the time-of-flight method in which the neutron is detected by recoil ionization and the energy deduced from the time of detection. FIG. 1 illustrates the essentials of a typical prior art time-of-flight detector, i.e., plastic scintillator 1, single phototube 2, and a counter circuit 3.

Typically, to measure the energy of a 100 MeV neutron to a precision of 1% requires a time precision of 1 nanosecond in a flight path of 30 meters. The time precision requirement can be relaxed by making the flight path longer but, since the solid angle subtended by the detector falls off as the reciprocal square of the path length, counting rate is sacrificed very rapidly as the path length is increased. Also, charge particle detection experiments are usually done with solid angles of about one millisteradian. At 30 meters, this corresponds to a detector area of 0.9 m$^2$, which is very large.

The imperative for making detectors large while retaining subnanosecond time resolution comes from both costs and practicability of performing neutron experiments. Time on modern accelerators is very expensive and reducing the experiment time may cut the experiment costs substantially. In addition, the length of time of accelerator operation without a significant phase drift (which would spoil the neutron energy measurement) may be only about an hour. Thus, it is important to be able to make any single measurement within times of the order of an hour.

The size of a detector and its time resolution are intimately related. Since the neutron interactions giving rise to photons occur randomly throughout the volume of the scintillator, a time spread results due to the differences in transit times of the neutrons and the light from different parts of the scintillator. This effect, if uncompensated, would limit the detector to a very small size. Thus, there exists a need to provide a neutron detector in which a large scintillator can be utilized without substantially degrading the time resolution. The present invention was conceived to meet this need in a manner to be described hereinbelow.

SUMMARY OF THE INVENTION

It is the object of the present invention to provide a scintillation detector which allows the use of a large scintillator without substantially degrading the time resolution when making neutron time-of-flight measurements.

The above object has been achieved in the present invention by positioning a scintillator which is utilized for neutron time-of-flight measurements at a desired angle with respect to the incoming neutron beam such that the sum of the transit times of neutrons and photons in the scintillator is substantially independent of the position of the scintillation points within the scintillator. This geometrical compensation yields light pulses at the phototube whose origin times do not depend on the position of the scintillation but whose rise-times do depend on position. Extrapolated zero timing is employed rather than the usual constant fraction timing. As a result, a larger scintillator can be used that increases the data rate and shortens the experiment time. Also, each extrapolated zero-timing achieves timing that is independent of the pulse rise-time and the pulse amplitude.

DESCRIPTION OF THE PREFERRED EMBODIMENT

Figure 1:
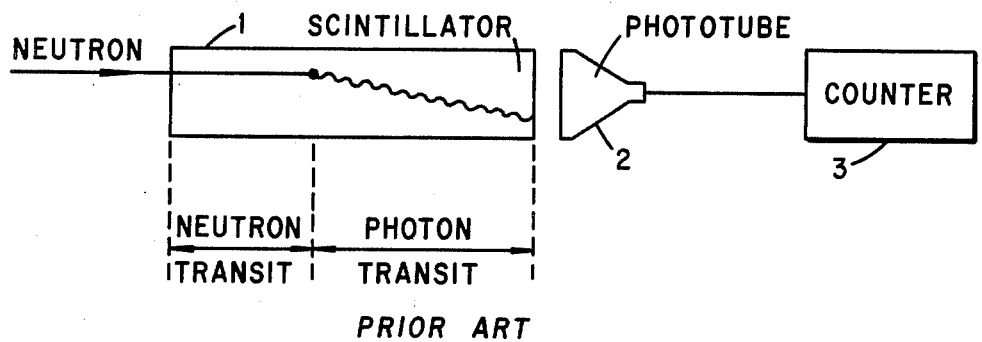
FIG. 1 is a schematic illustration of a conventional neutron scintillator with a single phototube and a counter.

As mentioned above, the physical size of the scintillator, utilized in the prior art arrangment as illustrated in FIG. 1 of the drawings, is limited to very small sizes in order to achieve the proper time resolution.

Figure 2:
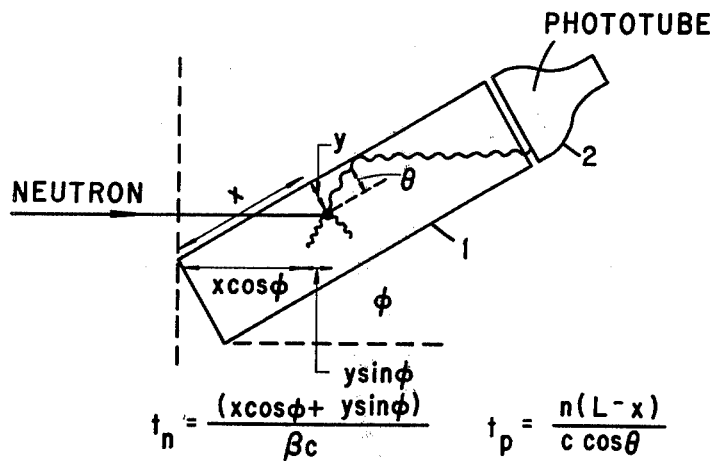
FIG. 2 is a schematic illustration of a neutron scintillator which is tilted with respect to an incoming neutron beam in accordance with the present invention.

The physical arrangement of the scintillator as illustrated in FIG. 2 of the drawings provides for an adequate time resolution while at the same time permitting the use of a larger scintillator than heretofore possible. This is achieved in the present invention by orienting the scintillator 1 of FIG. 2 at a desired tilt angle $\phi$ with respect to an incoming neutron beam. The energy of the incoming neutron beam determines the value of the tilt angle $\phi$ to achieve the desired time compensation and thus provide for an efficient time resolution in neutron time-of-flight measurements.

The scintillator 1 of FIG. 2 may be made up of slabs of plastic scintillators or of a solid single piece, or liquid scintillators, for example. Scintillators used in testing this invention were (a) three slabs of NE 102 plastic, each of which is 1.27 cm thick by 3.81 cm wide by 45.72 cm long coupled to an RCA-8875, 5 cm diameter phototube, and (b) 6 slabs 2.5 cm thick by 15 cm wide by 100 cm long coupled to an RCA-4522 12.7 cm diameter phototube. It should be understood that the size of the scintillator is not limited to these dimensions.

In FIG. 2, the time of arrival of a photon at the phototube 2 from a scintillation occurring at the coordinates x,y in the scintillator 1 is:

$$t = t_o + \frac{nL}{c\cos\theta} + \frac{x}{c}\left(\frac{\cos\phi}{\beta} - \frac{n}{\cos\theta}\right) + \frac{y\sin\phi}{c\beta}$$

where $t_o$ is the neutron time-of-flight up to the scintillator, n is the index of refraction of the scintillator, L is the length of the scintillator, c is the velocity of light, $\beta$ is the ratio of the neutron velocity to the velocity of light, $\theta$ is the angle of reflection of the photon with respect to the axis of the scintillator, and $\phi$ is the tilt angle of the scintillator with respect to the incoming neutron beam. In order to achieve the desired time compensation, the t of the above equation should be made substantially independent of x and y for a given neutron energy, i.e., a given value of $\beta$.

The condition for cancelling the x dependence of the measured time from the above equation is:

$$\cos\phi/\beta - n/\cos\theta = 0.$$

Figure 5:
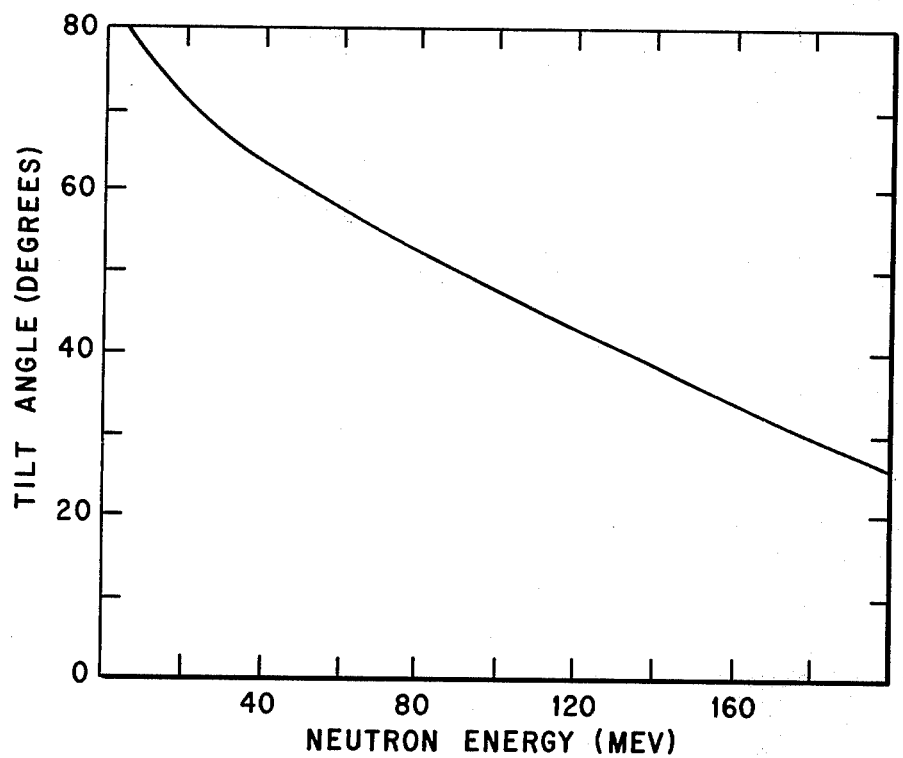
FIG. 5 is a graph illustrating the proper tilt angle for the scintillator for various, respective neutron energies of the incoming neutron beam to the scintillator.

FIG. 5 shows the required angle $\phi$ to satisfy this condition for the axial light rays, i.e., $\theta=0$, as a function of neutron energy. Thus, by selecting a proper tilt angle, $\phi$ (corresponding to a particular neutron energy), the sum of the transit times of the neutrons and photons in the scintillator is substantially independent of the point of scintillation within the detector for neutrons of that energy.

Since no reflector is used on the surface of the scintillator of FIG. 2, total reflection occurs when $\phi$ is smaller than some angle $\theta_{max}$, where $\sin(\pi/2-\theta_{max})=1/n$. For $\theta > \theta_{max}$, the light is lost. For $n=1.58$, $\theta_{max}=51°$, and the fraction of the forward emitted light that reaches the phototube is:

$$\lambda = (1-\cos 51°) = 0.37$$

The light pulses vary in amplitude because the neutron loses a random fraction of its energy in its interaction with the protons and carbon nuclei in the scintillator. The light pulses vary also in rise-times. Pulses from scintillations close to the phototube rise faster than those from scintillations far from the phototube. It is necessary to compensate for both amplitude and rise-time variations. Constant fraction timing, normally used to compensate for amplitude variations is not satisfactory with long scintillators because the time required to reach a given fraction is different for pulses of different rise-times.

I use, instead, what I call quadratic extrapolated zero timing. To understand this extrapolation, consider a Fourier series expansion of the pulse shape. The height as a function of time can be written as $$h(t) = A_o + A_1 \cos(t/a) + A_2 \cos(2t/a) + \ldots$$

where I have ignored terms in sin (nt/a) because I require that $h(o)=(dh/dt)_o=0$. If the rise-time is near the bandwidth limit, $$h(t) = A[1-\cos(t/a)],$$

which for small t is $h(t) = A(t/a)^2$. This expression can be inverted to $$t(o) = t(h) - [t(4h) - t(h)],$$

which is independent of both A and a. I obtain t(o) experimentally by using two discriminators set respectively at h and 4h and generating analog signals for the lower level crossing time and the time difference with time-to-amplitude converters and subtracting the difference signal from the lower level signal. A block diagram of the electronics is shown in FIG. 4.

Figure 4:
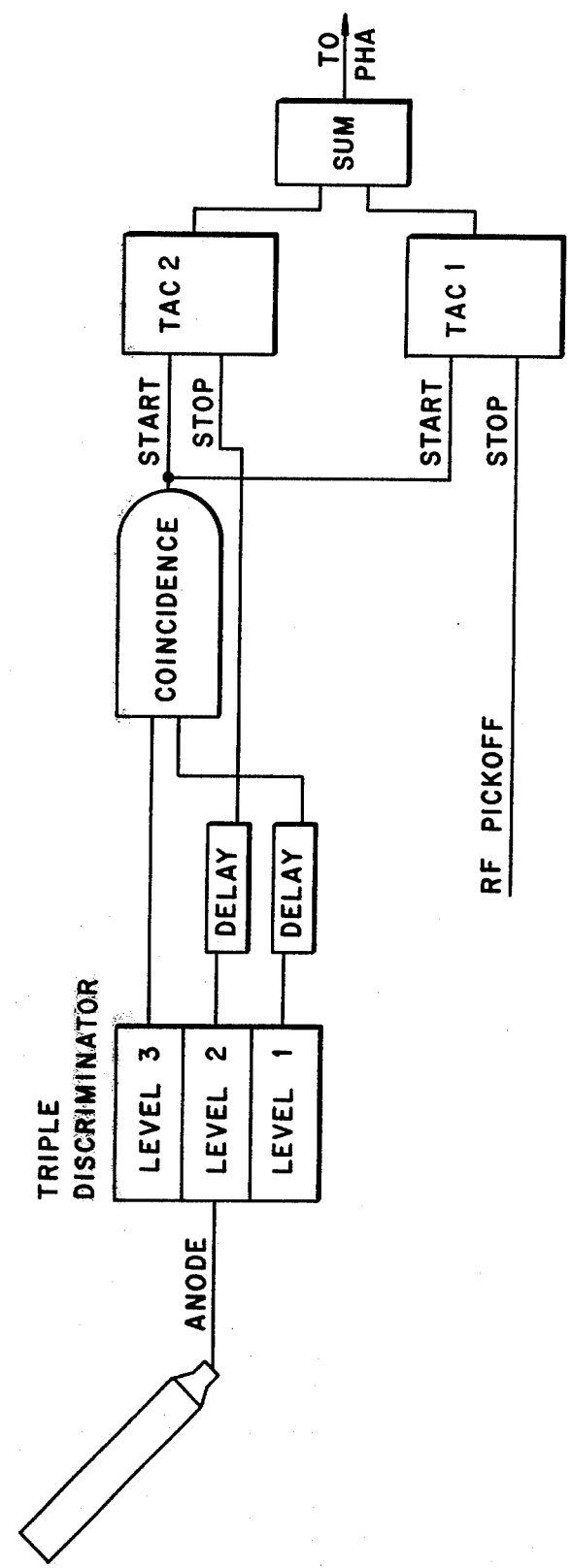
FIG. 4 is a block diagram of an electronic read-out circuit utilized for data-taking with a tilted scintillator.

In FIG. 4, a triple discriminator is connected to the output of the phototube. The three levels of the discriminator are set at different thresholds. The threshold levels are chosen so that the time between the first threshold level and the second threshold level is equal to the time from the beginning of the pulse to the first threshold crossing. At time $t_1$ the pulse reaches the first threshold amplitude, and at time $t_2$ it reaches the second theshold amplitude. The time-to-amplitude converter, TAC 1, is set up to measure $t_1$, and another converter, TAC 2, is set up to measure $t_2-t_1$. Then subtracting the output of TAC 2 from the output of TAC 1 corrects $t_1$ to be the true origin time. By tilting the axis of the scintillator, the time profiles of the pulses are displaced so that they all originate at the same time. Thus, variations in position of the scintillator as a function of neutron energy produce variations in rise-times, but not of origin times of the pulses when the above zero timing arrangement is utilized. Therefore, a desired time resolution is provided by the above technique.

Tests with 26 MeV neutrons on a scintillator $3.8 \times 3.8 \times 46$ cm showed that good time compensation is achieved, and sub-nanosecond time resolution was realized. For example, the time resolution of about 0.8 ns was achieved.

Tests with 120 MeV neutrons on a scintillator $15 \times 15 \times 100$ cm were performed for data taking in (p,n) reaction experiments at the Indiana University Cyclotron Facility with comparable results to the above tests with the smaller scintillator. Further details of such tests are presented in a paper published in IEEE Transactions on Nuclear Science, Vol. NS-25, No. 1, February 1978, entitled "High Efficiency Detectors For Time-Of-Flight With High Energy Neutrons."

Figure 6:
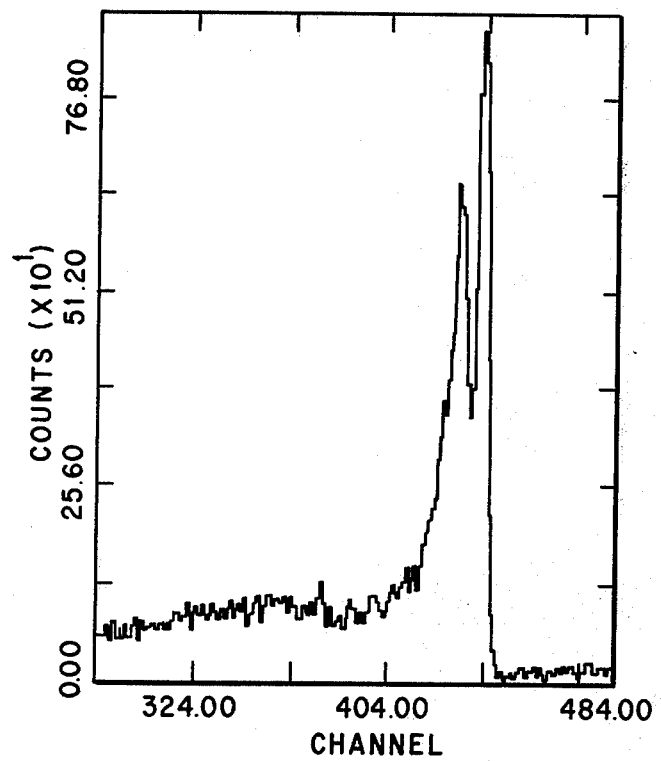
FIG. 6 is a graph illustrating a neutron spectrum obtained from $^9$Be (p,n)$^9$B when the scintillator is tilted in accordance with the present invention.

FIG. 6 shows a time spectrum from $^9$Be (p,n)$^9$B, with 120 MeV protons obtained by utilizing the circuitry of FIG. 5 in the second tests mentioned above. The time resolution was between 0.8 and 0.9 ns full width half maximum (FWHM). Without proper time compensation in the scintillator and time resolution in the data taking, it would be difficult to see a distinction between the two major peaks in the spectrum.

By utilizing extrapolated zero timing and by tilting the scintillator at a desired angle as a function of neutron energy, as discussed hereinabove, it is now possible to use a scintillator whose volume can be increased by a factor of 10-20 with a corresponding increase in the data rate over that which was heretofore possible, while at the same time achieving time compensation in the scintillator and sub-nanosecond time resolution in the data taking. Thus, a large savings of hundreds of hours per year in accelerator time will result, and previously impossible experiments can be performed.

Figure 3:
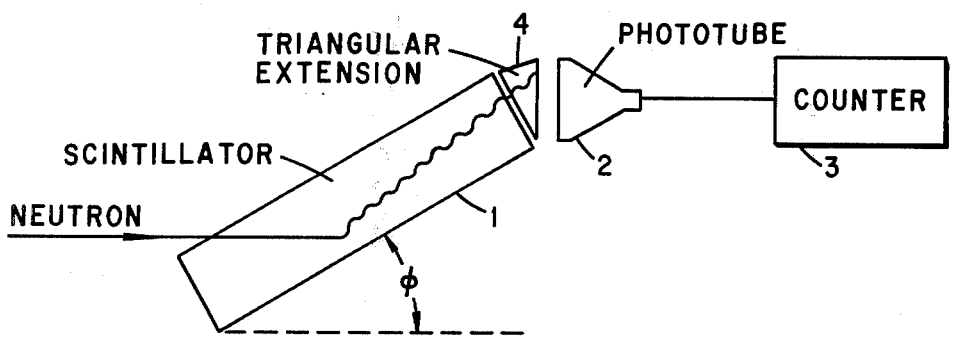
FIG. 3 is a schematic illustration of another embodiment of the present invention.

In cases where the thickness of the scintillator is relatively large, the scintillator can be extended as shown in the embodiment of FIG. 3 by adding a triangularly-shaped extension 4. With this improvement, photons originating at different points in the scintillator along the neutron path and following parallel paths to the phototube 2 see different optical path lengths that compensate for their different flight times.

This invention has been described by way of illustration rather than by limitation and it should be apparent that it is equally applicable in fields other than those described.

What is claimed is:

1. A method for providing time compensation in a cylindrical scintillator, which is serially connected to a phototube and a counter, utilized in neutron time-of-flight measurements of a neutron beam striking said scintillator thereby creating photons at points of scintillations within said scintillator, and providing adequate time resolution in said measurements, comprising the steps of: orienting the axis of said scintillator at a desired tilt angle with respect to said neutron beam as a function of the energy of said neutron beam such that the sum of the transit times of said neutrons and said photons in said scintillator are substantially independent of the points of scintillations, thus achieving said time compensation; and utilizing extrapolated zero timing in said counter to provide compensation for both variable amplitudes and for variable rise-times of said photons, thus achieving said adequate time resolution; whereby the volume of said scintillator can be increased by a factor of 10-20 with a corresponding increase in the data rate of said measurements.

2. The method set forth in claim 1 wherein said scintillator tilt angle is a decreasing function of an increasing neutron energy.

3. The method set forth in claim 1 wherein, for a scintillator $15 \times 15 \times 100$ cm, a neutron energy of 120 MeV, and a tilt angle of 45°, the time constant and the time resolution effected by said method are 1.5 ns and 0.8 ns, respectively.

* * * * *